(12) United States Patent
Mahbubani

(10) Patent No.: US 9,860,597 B2
(45) Date of Patent: Jan. 2, 2018

(54) SYSTEM FOR CREATING A SOUVENIR FOR A USER ATTENDING AN EVENT

(71) Applicant: Video Plus Print Company, Hong Kong (CN)

(72) Inventor: Vijay Mahbubani, Hong Kong (CN)

(73) Assignee: Video Plus Print Company, Hong Kong (HK)

( * ) Notice: Subject to any disclaimer, the term of this patent is extended or adjusted under 35 U.S.C. 154(b) by 0 days.

(21) Appl. No.: 15/193,862

(22) Filed: Jun. 27, 2016

(65) Prior Publication Data

US 2016/0381423 A1    Dec. 29, 2016

Related U.S. Application Data

(60) Provisional application No. 62/185,152, filed on Jun. 26, 2015.

(51) Int. Cl.

| H04N 21/472 | (2011.01) |
|---|---|
| H04N 21/41 | (2011.01) |
| H04N 21/418 | (2011.01) |
| H04N 21/414 | (2011.01) |
| H04N 21/438 | (2011.01) |
| H04N 21/426 | (2011.01) |

(52) U.S. Cl.
CPC ....... *H04N 21/472* (2013.01); *H04N 21/4117* (2013.01); *H04N 21/4181* (2013.01); *H04N 21/4182* (2013.01); *H04N 21/41407* (2013.01); *H04N 21/42684* (2013.01); *H04N 21/438* (2013.01)

(58) Field of Classification Search
None
See application file for complete search history.

(56) References Cited

U.S. PATENT DOCUMENTS

| 5,534,888 | A |  | 7/1996 | Lebby |  |
|---|---|---|---|---|---|
| 5,594,794 | A | * | 1/1997 | Eyer | ...................... H04N 7/165 |
|  |  |  |  |  | 348/E7.056 |
| 5,761,485 | A |  | 6/1998 | Munyan |  |
| 5,788,507 | A |  | 8/1998 | Redford |  |
| 5,893,132 | A |  | 4/1999 | Huffman |  |
| 6,269,238 | B1 |  | 7/2001 | Iggulden |  |
| 6,906,705 | B2 |  | 6/2005 | Matsuo |  |
| 6,975,832 | B2 |  | 12/2005 | Adams |  |
| 7,299,971 | B2 |  | 11/2007 | Marggraff |  |
| 8,161,671 | B2 |  | 4/2012 | Mason |  |
| 8,190,876 | B2 |  | 5/2012 | Schneider |  |
| 8,248,472 | B2 |  | 8/2012 | Hewitt |  |

(Continued)

OTHER PUBLICATIONS

International Search Report and Written Opinion from corresponding PCT application PCT/CN2016/087303, dated Jun. 26, 2016.

*Primary Examiner* — Hoang-Vu A Nguyen-Ba
(74) *Attorney, Agent, or Firm* — Stine Law Ltd.

(57) ABSTRACT

A video presentation device is disclosed. The video presentation device comprises an electronic module including a microcontroller and a memory adapted for storing digital content, a communication link adapted to communicatively couple the electronic module with a host server, to receive multimedia digital content from the host server upon command from the host server, and a video display for playing the multimedia digital content upon command of the electronic module.

1 Claim, 4 Drawing Sheets

(56) References Cited

U.S. PATENT DOCUMENTS

| | | |
|---|---|---|
| 9,100,667 B2 | 8/2015 | Moore et al. |
| 2003/0013459 A1 | 1/2003 | Rankin et al. |
| 2005/0260551 A1 | 11/2005 | Rubin |
| 2008/0109309 A1 | 5/2008 | Landau |
| 2008/0198984 A1 | 8/2008 | Green |
| 2008/0254427 A1 | 10/2008 | Neviaser |
| 2010/0164836 A1 | 7/2010 | Liberatore |
| 2010/0175287 A1 | 7/2010 | Gupta |
| 2011/0059426 A1 | 3/2011 | Mamigonians |
| 2011/0119967 A1 | 5/2011 | Kawesch |
| 2011/0181624 A1 | 7/2011 | Nugara |
| 2011/0214318 A1 | 9/2011 | Dunko |
| 2011/0232141 A1 | 9/2011 | Sapp |
| 2012/0290336 A1* | 11/2012 | Rosenblatt ............ G06Q 30/02 705/5 |
| 2013/0155305 A1 | 6/2013 | Shintani |
| 2014/0164375 A1 | 6/2014 | Persson et al. |
| 2014/0349721 A1* | 11/2014 | Dawson ................ A63F 13/216 463/1 |
| 2015/0028994 A1* | 1/2015 | Prestenback ............ G05B 1/01 340/5.6 |
| 2015/0243062 A1* | 8/2015 | Tyson ...................... H04N 1/00 348/207.11 |
| 2016/0068002 A1 | 3/2016 | Keller |

* cited by examiner

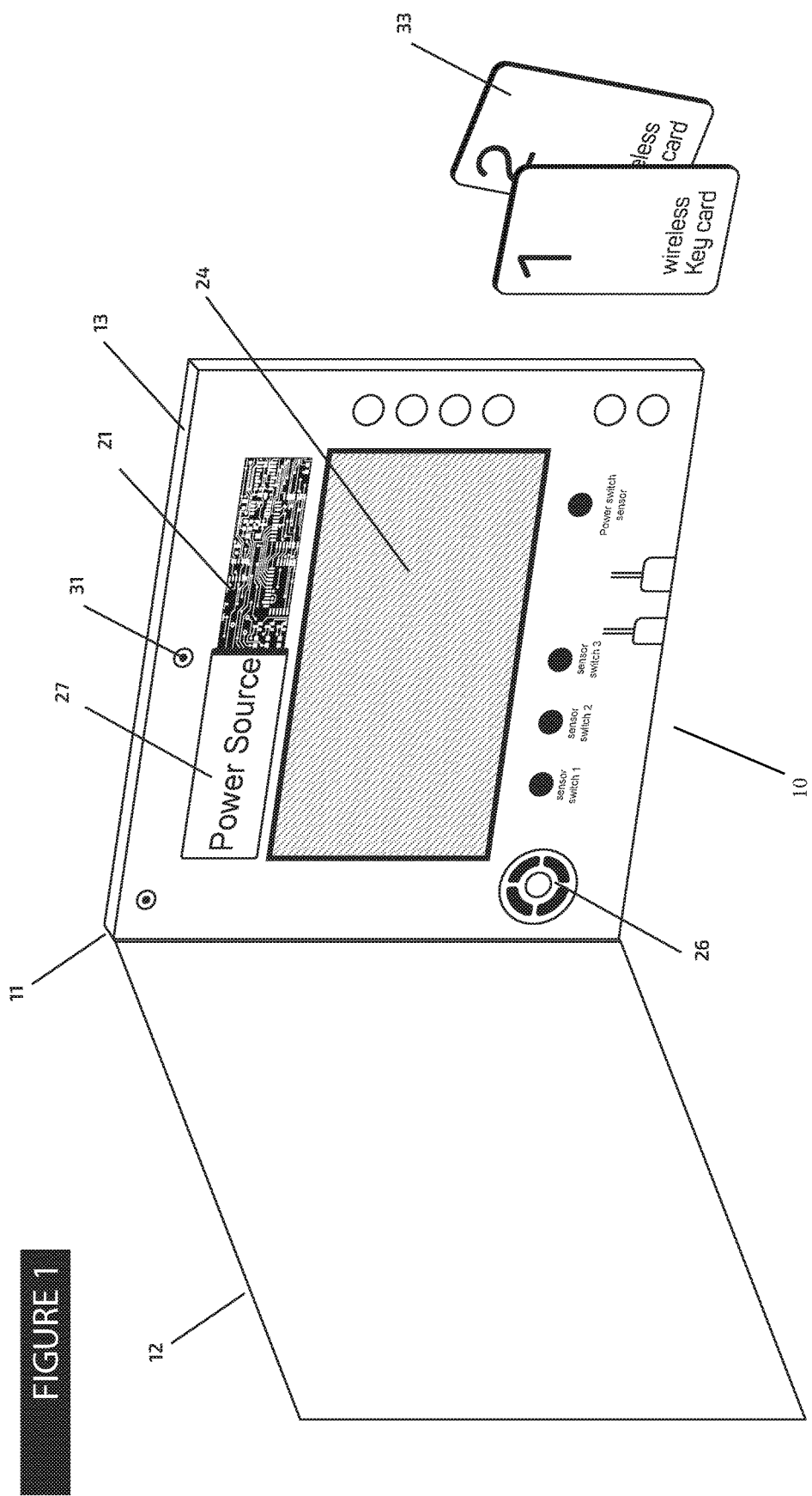

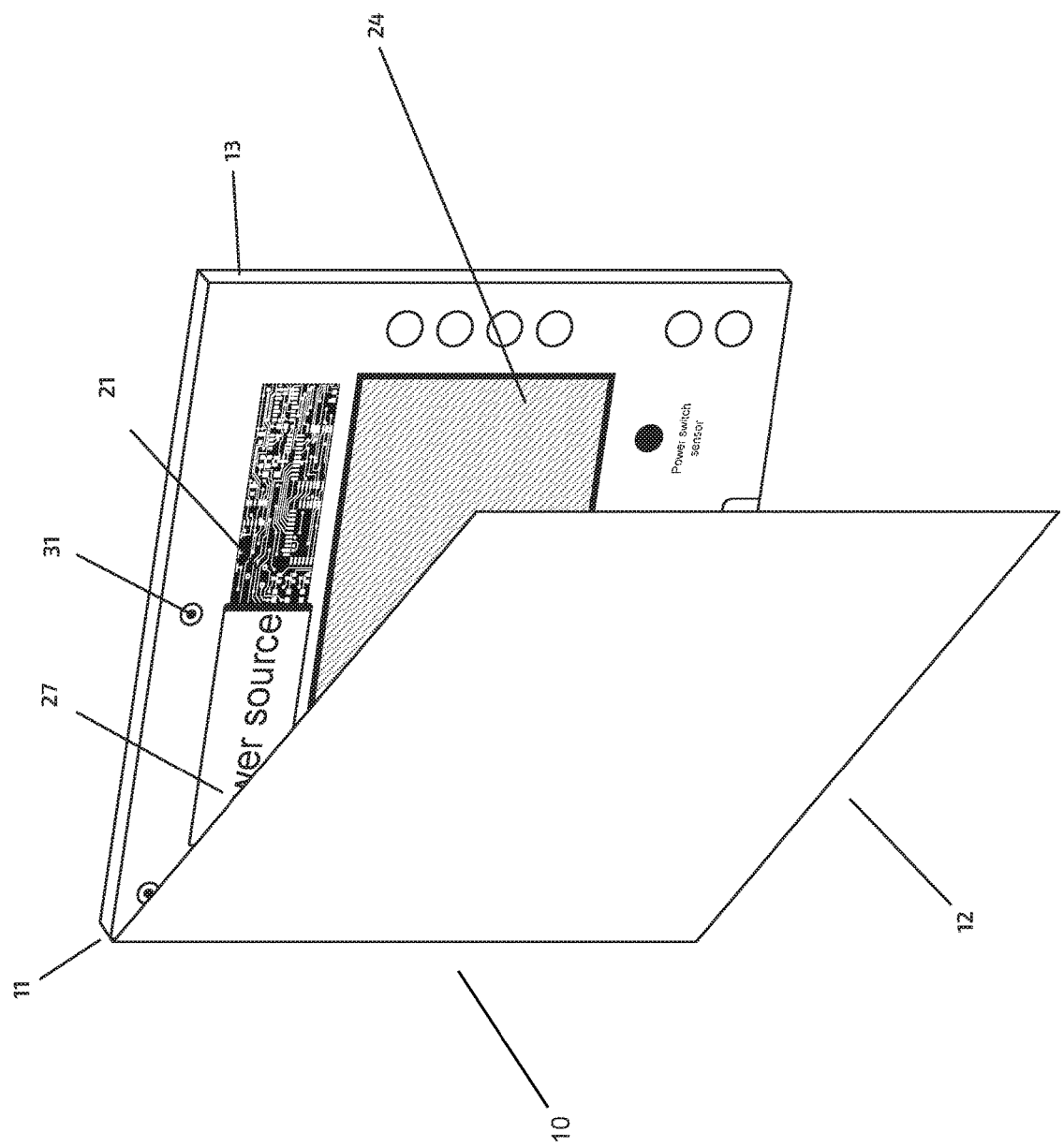

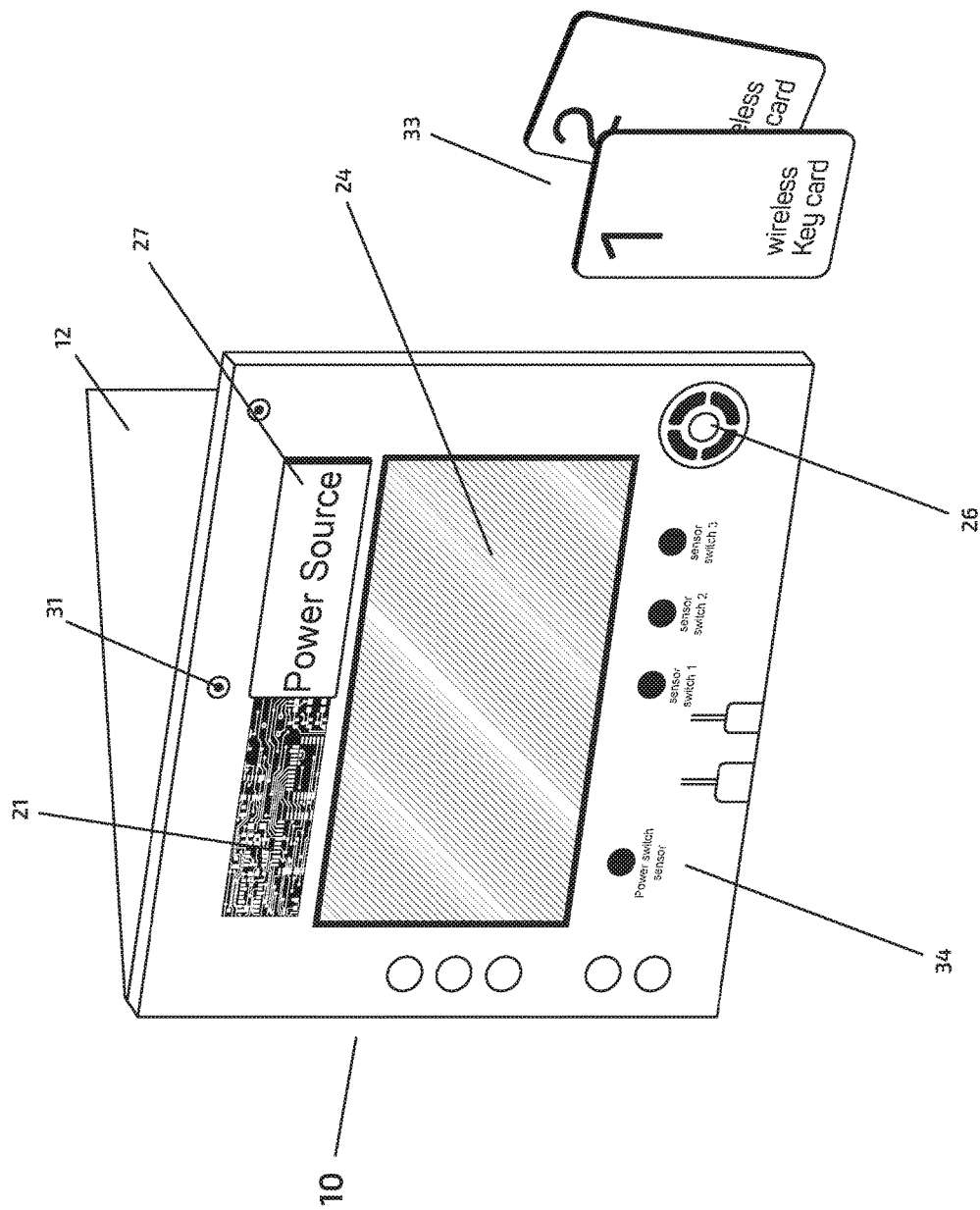

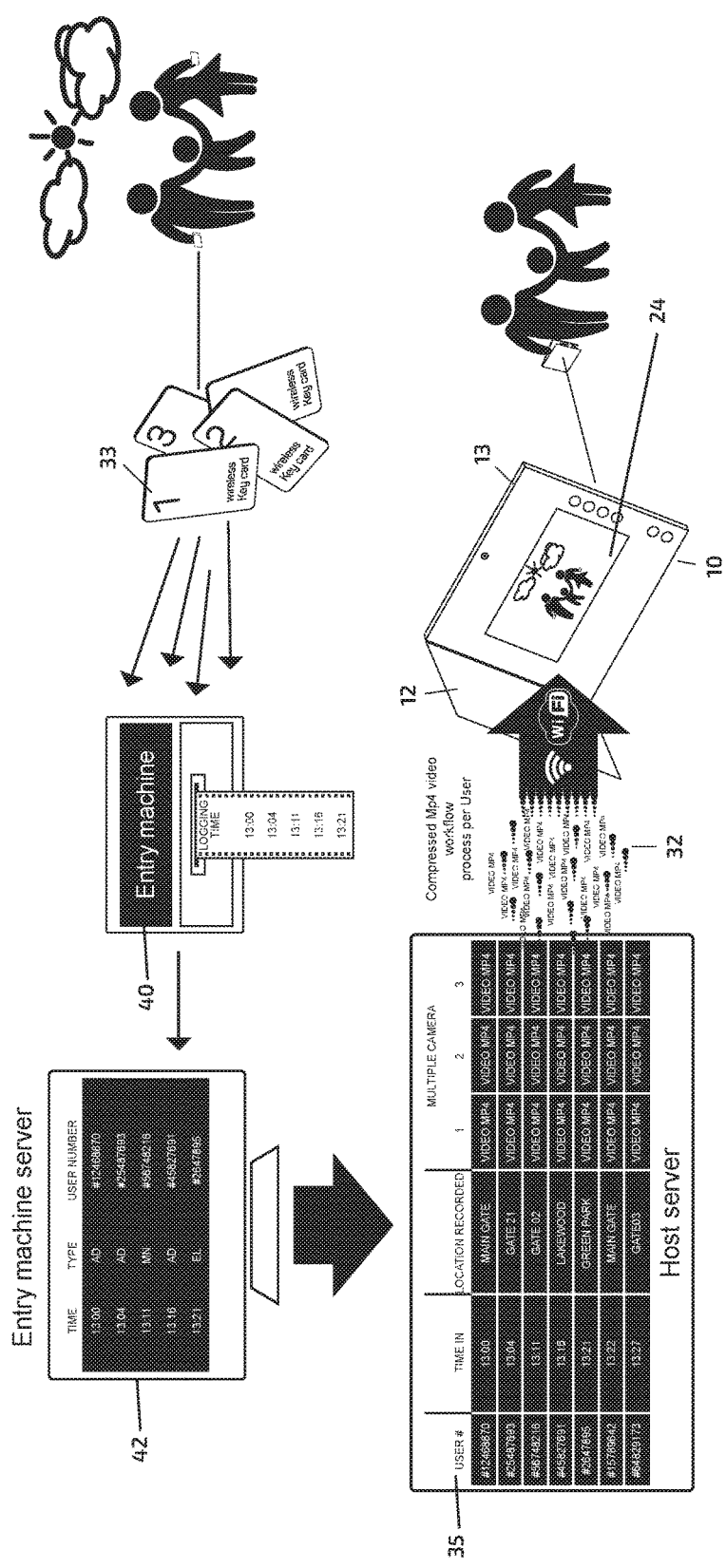

SYSTEM FOR CREATING A SOUVENIR FOR A USER ATTENDING AN EVENT

BACKGROUND

Video presentation devices, such as in the form of a foldable structure, or booklet, are known, such as video brochures promoting a product, a service, a performance artist, or the like. In certain cases, such as that of a merchandising device promoting a performance artist, the merchandising device may include printed material and/or still photographs or other artwork printed on the brochure, as well as a speaker and a visual display device for playing recorded audio and/or video files stored in memory resident on the device. However promotional material associated with such devices may quickly become dated.

Additionally, in certain venues, such as theme parks, photographs and/or videos (i.e., recordings) of attendees at the venue may be recorded, as when the attendees are participating in a particular activity, such as sliding down a water slide. The recordings may subsequently be presented for sale to the attendees. Typically, this may require the attendees to wait in a line to view their particular recording and then, if interested, purchase the recording. If an attendee chooses not to wait in the line, the attendee may likely not purchase the video.

SUMMARY

In accordance with the present invention, a video presentation device is provided which may automatically be updated, so as to keep video content stored on the device current.

BRIEF DESCRIPTION OF THE DRAWINGS

FIG. 1 is a perspective view of one embodiment of a video presentation device in accordance with the present invention; and FIG. 2 is another perspective view of the device of FIG. 1;

FIG. 3 is a perspective view of the device of FIG. 1, but having components rearranged; and FIG. 4 illustrates a use of the device of FIG. 1 in conjunction with a theme park.

DETAILED DESCRIPTION OF THE INVENTION

While this invention is susceptible to embodiment in many different forms, there will be described herein in detail, specific embodiments thereof with the understanding that the present disclosure is to be considered as an exemplification of the principles of the invention and is not intended to limit the invention to the specific embodiments illustrated.

In accordance with the invention, and referring to FIGS. 1-3, one embodiment of a video presentation device, generally designated 10, is described. The presentation device 10 may be foldable along a spine 11, and the may include a cover page 12, a back page 13 and one or more inner pages (not shown) there between. Locations of certain components shown in FIG. 3 differs somewhat from similar components shown in FIGS. 1 and 2, illustration the component locations may vary without departing from the spirit and scope of the present invention.

As is known in the art, the pages 12, 13 may include conventional text and/or artwork. The text and the artwork may relate to a product, an event, a performing artist to be promoted, a destination such as a theme park, or the like.

The may include an electronic module 21 (FIG. 3) disposed within the back page 13. The module 21 may include memory for storing digital content in the form of conventional electronic files of recordings of still images, video images, and/or audio, alone or in combination. The device 10 may also include a conventional video display 24 for displaying stored recorded images and a sound transducer 26 for audibly playing stored audio. The video display 24 may include conventional touch screen capability, such that menu icons or the like may be displayed and actuated. The sound transducer 26 may be a component which functions both as a speaker and a microphone, or it may be two separate devices, one a speaker, the other a microphone. As used throughout this specification, the sound transducer 26 may be referred to as a speaker if the sound transducer 26 is being used as a speaker, and the sound transducer 26 may be referred to as a microphone if the sound transducer 26 is being used as a microphone. Components of the electronic module 21 may be conventionally interconnected and may be powered by a conventional power source 27, which may be a rechargeable battery.

The electronic module 21 may include a conventional micro-controller, such as a microprocessor, programmed to transmit and receive, collectively 'transceive', one of the electronic files, over an electronic communication link 32 between the memory and a host server, or host device, 34. The electronic communication link 32 may be a direct, wired connection, or a wireless connection such as cellular, Wi-Fi, Bluetooth, or the like.

The module 21 may communicate with the memory and the host device 34, to transcieve electronic files between the memory and the host device 34 under control of the microprocessor.

The device 10 may further include a user input to permit the user to input commands to the device 10, and in particular, to the microprocessor. The user input may be in the form of one or more button type actuators, pushbutton, capacitive, light sensitive, or the like. Alternatively, the user input may include the touch screen incorporated in the video display 24. Additionally, the user input may be in the form of speech recognition software stored in the memory, operable under command of the microprocessor, and adapted to receive audible commands received over the sound transducer 26.

The device 10 may include a conventional switch (not shown), such as a conventional push-button switch, a conventional capacitive touch sensing switch, a conventional light sensing switch, or the like, to detect when one or more of the pages has been opened relative to the other ones of the pages, which may cause playing of one of the audio/visual files stored in the memory audibly via the speaker 26 and/or visually via the visual display device 10, when the particular page is opened.

The device 10 may include one or more conventional cameras 31 and conventional associated camera software stored in the memory.

The device 10 may be programmed to have an ID, such as an alphanumeric ID or some other form of device identification code. The ID may be unique to the device 10, to a selected group of devices 10, or otherwise.

The device 10 may allow content relating to the user possessing the device 10 with the unique ID to have access to digital content relating to the user having the particular device.

The device 10 may have one or more accompanying keycards 33 which may permit one or more of the users to use independently of the device 10, but which associates the user(s) with the device 10. The device 10 and the keycards 33 may also include conventional location tracking and/or sensing technology, so that the location of the user(s) possessing the device 10 and the keycards 33 may be tracked. The user may make certain purchases or participate in certain activities, which may permit some digital content to be created surrounding that activity.

The digital content may be transferred to the device 10 on demand, without the user having to initiate/accept the digital content before it is downloaded.

The digital content may also be transferred temporarily into the device 10, where the user is able to view the content for a limited period of time, before it is automatically deleted.

The digital content that is transferred into the memory of the device 10 for a limited period of time may be extended for a longer period of time or the digital content may be retained by the user for a longer period of time, such as indefinitely, under the command of the user, and permission by the host device 34, which command may be made via the user input. Storage of the digital content for a longer period of time may be facilitated with the help of an online payment gateway system, which may be resident on the host device 34.

The digital content stored in the memory of the device 10 may be controlled by the host device 34, which digital content may be deleted from the device 10 remotely upon a command from the host device 34 without the user's involvement.

The digital content stored in the memory in the device 10 may also be controlled by the user and may be manually deleted by the user via the user input.

Various software or other applications may be stored in the memory, which may provide a specific experience for the user that may surround a single subject matter, corporate entity, event, place or a person The device 10 may be programmed to allow limited installation of additional software, or it may be programmed to completely block the user from installing any new software into the device 10.

The device 10 may be in the form of a foldable structure that activates when the pages of the device 10 are separated from each other.

The device 10 may be configured with a protocol such as iBeacon, or the like, that may command the device 10 to perform a certain action, such as to play certain content or execute a certain command when it is near a particular iBeacon-compatible transmitter The device 10 may include multiple sensors that allow the device 10 to be inserted into a book like structure with a cut out in each page. The user may view digital content in a specific order relating to the printed content of each particular page.

The wireless functionality of the device 10 may permit the digital content to transfer the content into the device 10 in a particular folder or order, so that it will play the digital content in a specific order based on the triggers concealed within each page or to match each button or folder.

The device 10 may be partially disabled using software or hardware to prevent a user to extract the digital content from the device The device 10 may include a conventional location detection module, such as GPS functionality, which may be contained with the electronic module 21. The location detection module may continuously, or periodically, communicate the location of the device 10 to the host device 34, so that the host device 34 knows the location of the device 10. The host device 34 may use this location information to cause the host device 34 to transfer specific digital content to the device 10 based on the position of the device 10 (and thus likely the position of the user).

The device 10 may include conventional virtual reality capability allowing the user to experience 360° video capability by moving the direction of the device 10.

Selection of one of the icons may cause the device 10 to connect with the host device 34 to download updated information, such as in the form of data files, about the subject matter of the device 10.

Selection of another one of the icons may cause the device 10 to access an authorized Twitter, Instagram, or other social media, account.

The device 10 may be programmed to automatically synchronize with various social media accounts for updates on a periodic basis.

The device 10 may permit a user to enter their age, gender and other preferences, so that a server/content provider may push relevant content for that user allowing for tailor made content being pushed to an individual user based on various parameters.

The device 10 may be configured to show a unique number or message on the screen that could be the unique ID of the device 10, so that this unique ID is visible while playing the content on the LCD screen.

The device 10 may be configured to communicate with a cloud storage system that allows the user to back up the digital content on the cloud, so that if the user loses the device 10, the user may replace the device 10 and download the same content into a new device. This may be achieved while still giving full control to the digital content provider who extends restricted access of the digital content to the user, thereby preventing the user to be able to transfer the digital content to any other device, other than an authorized device. This may permit such a device to act as a long term digital memorabilia device as the user will never lose their content and can keep it for years to come.

As one example of an application of the present invention, the device 10 may be utilized as a promotional product, such as for a popular singer. The device 10 may be distributed, including printed text and photographs of the singer. The device 10, as originally distributed, could also include a music video of a performance by the singer. But rather than the stored digital content remaining static, the device 10 may remain current by permitting a user to follow the singer, such as via the singer's Twitter and/or Instagram social media account. Additionally, subsequent music videos may be downloaded to the device 10, either upon the control of the singer and/or the user. The device 10, in effect, may be configured to never become out-dated. This device 10 could similarly be utilized to promote a commercial product, a business, or the like, also never becoming out-dated.

As another example of an application of the present invention, the device 10 may be utilized as a souvenir of one's attendance at an event, such as a visit to a theme park.

At a theme park, people are often required to wait in line after each ride or experience, just to look at one or more of their photographs and then stand in line to purchase them, if desired. And still photographs fail to capture the dynamic experience of a visitor of the park, which could be captured in a video format.

The device 10 may permit the user/visitor from not having to stand in a line waiting to see a photograph or video of them experiencing the ride, but instead the photograph or video may be delivered as digital content directly to their respective device 10, no matter where they are in the theme park, or in the world. Theme park owners may also have an option to send the content to the device 10 for the visitor to see only once or twice for example, after which the visitor/user may be provided the option to either retain their memory (i.e., the digital content) of them experiencing the ride and then buy this digital content or choose not to buy the digital content.

The theme park may also push tailor made content to the user, such as a greeting on birthdays, a discount coupon, free tickets, or the like.

FIG. 4 illustrates an example of the device 10 being used in conjunction with a visit to a theme park, although this may be applicable to visits to other destinations, such as ones in which a souvenir of the visit may be desired.

The device 10 may be initially presented to a user with appropriate, theme oriented printed text and artwork, as well as appropriate, "generic" digital content. Associated ones of the keycards 33 may also be presented to the user, such as if the user has one or more other members of the user's party. An entry machine 40 coupled to an entry machine server 42 may associate the keycards 33 with a particular one, or ones, of the device 10. This information may be communicated with the host device 34. The host device 34 may track the location of the device 10 and the associated keycards 33, activating cameras (not shown) distributed about the theme park at appropriate times.

As the user (and/or other members of the user's party) experiences the theme park, recordings may be made of the user's experience, such as of the user sliding down a water slide, and the recording may be transmitted from the theme park's host device 34 to the device 10. Such recordings may be made specific to the user due to the location tracking capability of the device 10, or associated ones of the keycards 33, described above.

The user may be given a period of time to view/listen to the particular recordings, and decide whether or not to keep the particular recordings, which may require a purchase of the recordings. In such a situation, the user need not wait in line to view the recordings, and may be much more likely to ultimately purchase the recordings. Upon completion, the user may have a unique souvenir of the user's visit to the theme park.

The device 10 may provide a multisensory experience. For example, if someone goes to a particular theme park, for example a park having Star Wars as a theme. One of the pages or the cover of the device 10 may be adapted such that images of light sabers, associated with the Star Wars theme, may suddenly power on with sound effects when the user does a certain action. The multisensory may be experienced through light and sound fitted inside a particular page or cover. The movement of the lights within a page that acts as a backlight under static images may create a dynamic experience and may help build the excitement of "coming attractions" further within the book.

The device 10 may include a conventional HDMI port to allow the user to connect the device 10 to their TV to broadcast the digital content on a bigger screen, in certain instances where the content is not restricted.

The 360° video experience may also be experienced using a touch screen capability, so people may scroll on the screen manually, such as for devices that don't have the directional functionality built into it.

The user may be provided the option to order a clone of the device 10 and have that mailed to others, such as grandparents for example, so all the content may be shared with loved ones not present at the park.

The device 10 may work in an environment such as between celebrities and their fans. Fans may use the device 10 where the fans may have access to restricted content that a fan that does not purchase such a device may not otherwise have. In such situations, the restricted digital content may be pushed to the device 10 (for example, live video footage of a concert in which the user was present, or an early access to new songs, music videos that have not yet been released in the open domain or behind the scenes footage etc.)

Celebrities may control the distribution of the content and limit it to a particular device, so as to avoid the content being distributed in an unauthorized fashion. With the help of the remote server, a celebrity may choose to remotely delete all the content that has been previously downloaded in such a device, so as to provide seamless updates and relevant content to the user based on various circumstances, events or situations.

From the foregoing it will be observed that numerous variations and modifications may be effected without departing from the spirit and scope of the invention. It is to be understood that no limitation illustrated herein is intended, or inferred. It is, of course, intended to cover by the appended claims all such modifications as fall within the scope of the claims.

What is claimed:

1. A system for creating a souvenir for a user attending an event, the system comprising:
   a host device associated with the event;
   an image presentation device associated with the user, the image presentation device including an electronic module including a microcontroller, a memory adapted for storing digital content and an image display for playing [multimedia] digital content stored in the memory upon command of the electronic module, and a location sensing module for cooperating with the host device for determining the location of the image presentation device at the event and adapted to transfer the determined location of the image presentation device at the event to the host device over a wireless communication link between the image presentation device and the host device, wherein the host device is configured to transmit digital content from the host device to the image presentation device over the wireless communication link; and
   an image recording device located at the event operable under control of the host device, the image recording device adapted to record as recorded digital content an area of activity when the host device determines the image presentation device is located within the area of activity;
   wherein the host device is configured to transmit the recorded digital content from the host device to the image presentation device over the wireless communication link, and the image presentation device is configured to receive and accept, upon command from the host device, the recorded digital content transferred from the host device, for subsequent display on the image display of the image display device for viewing by the user of the recorded digital content, wherein the recorded digital content is transferred from the host device to the image presentation device for subsequent display on the image display for viewing by the user of the recorded digital content for a period of time;

wherein the period of time for viewing by the user of the recorded digital content is determined upon command of the host device; and wherein the host device disables the image display device from displaying the recorded digital content upon completion of the period of time unless the recorded digital content is purchased.

* * * * *